Feb. 21, 1967  A. OFFNER  3,305,293
CATADIOPTRIC OPTICAL SYSTEM
Filed March 20, 1963
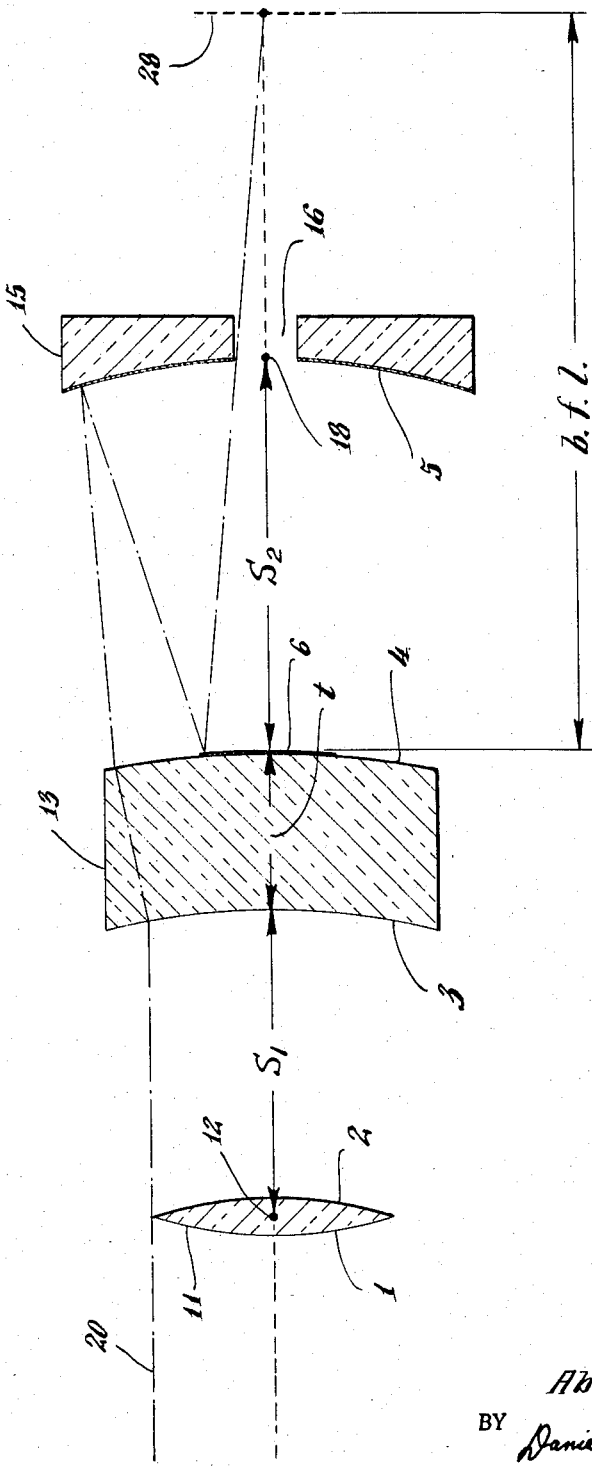
INVENTOR.
*Abe Offner*
BY *Daniel P. Leonson*
ATTORNEY.

United States Patent Office 3,305,293
Patented Feb. 21, 1967

3,305,293
CATADIOPTRIC OPTICAL SYSTEM
Abe Offner, Darien, Conn., assignor to The Perkin-Elmer Corporation, Norwalk, Conn., a corporation of New York
Filed Mar. 20, 1963, Ser. No. 266,691
9 Claims. (Cl. 350—201)

This invention relates to a highly corrected catadioptric optical system. More particularly, the invention is a three element anastigmat of relatively high optical speed, which is highly corrected for the various aberrations including elimination of secondary spectrum over a compartively large spectral region.

In order to have an accessible image plane in a catadioptric system, there must be at least two reflecting elements. With the addition of one refracting element, anastigmatic correction can be achieved in a flat field. Up to now, such three element anastigmats have required at least two aspheric surfaces. The invention provides a three element catadioptric anastigmat with no more than one aspheric surface.

In regions of the spectrum outside the visible, the number of transmitting materials suitable for use in highly corrected optical systems is greatly reduced. Since in general, at least two different optical materials are required for color correction, color-corrected anastigmats have not always been feasible in all spectral regions. In addition, because of the variation in relative dispersion of different materials over a large spectral region, color correction obtained by the use of two different types of materials is in general imperfect so that if a high degree of correction is required, systems using this type of correction are limited to a relatively narrow spectral region by secondary spectrum. However, if color correction is obtained by the use of only one refractive material for all of the refractive elements, there is, of course, no variation in the relative dispersion of these elements over the entire spectral region. Some specific embodiments of the invention utilize a single refractive material for both of the two refractive elements so as to eliminate the secondary spectrum over the entire spectral region utilized.

An object of the invention is to provide the simplest possible flat-field anastigmatic catadioptric system with an accessible image plane, simplicity being measured by the number of elements, optical surfaces and in particular, aspherical surfaces.

A similar object is to provide such a catadioptric anastigmat, which includes only three optical elements and a maximum of one aspheric surface.

A further object of the invention is the provision of such an optical system in which color correction over a wide spectral region is achieved by the use of two refractive elements made of the same material.

Other objects and advantages of the invention will become apparent to those skilled in the art upon reading the following specification in conjunction with the accompanying drawing in which:

The sole figure is a vertical section through an exemplary embodiment of the inventive optical system.

The optical system shown in the drawing consists of three elements, a primary mirror 15, a substantially concentric shell 13, and a positive or converging correction lens 11, which is located at the center of curvature of the concentric shell 13. The central part of the convex surface 4 of the shell 13 is made reflecting as shown at 6 and acts as a secondary mirror. Light from a distant object, exemplified by ray 20, passes through corrector 11 and the clear portion of shell 13 to primary mirror 15 where it is reflected back to the reflecting portion 6 of shell 13 and finally comes to a focus at the image plane 28 after passing through a hole 16 in the primary mirror 15. The optical surfaces encountered by such rays are numbered consecutively from 1 through 6 as shown.

The combination of mirrors 15 and 6 and corrector plate 11 can normally be corrected to form anastigmatic images on a flat field behind mirror 15 only if the corrector plate and at least one of the two mirrors are aspheric. By making the secondary mirror 6 part of a substantially concentric shell 13 of appropriate thickness, such correction can be achieved with spherical surfaces on both the primary and secondary mirrors. In addition, the spherical aberration of the shell is such as to compensate for the spherical aberration of the mirror system so that by proper combination of parameters, anastigmatic correction can be achieved with no aspherics. There is a contribution to longitudinal chromatic aberration by the shell which can be balanced by an equal and opposite contribution at its center of curvature. The simplest way to do this is to use a single element corrector 11 which has appropriate positive power. When this is done, the system is corrected for both longitudinal and lateral chromatic aberration.

A well corrected system in accordance with this invention must have the following relations between its parameters. Let:

$N$ = refractive index of material of shell 13
$V$ = reciprocal dispersion of material of shell 13
$N_c$ = refractive index of material of corrector 11
$V_c$ = reciprocal dispersion of material of corrector 11
$t$ = axial thickness of shell 13 (as shown in the drawing)
$P_c$ = power of corrector lens 11
$P$ = power of shell 13
$E$ = ratio of radii of secondary mirror surface (6) to primary mirror surface (5),
and take the focal length of primary mirror 15=1

The power of the shell $P$ is already known in terms of its long radius $2E$ and its thickness $t$. It is given by the relation:

$$P = \frac{-\frac{N-1}{N}}{2E(2E-t)}$$

If the system is to be color corrected by a single corrector element at the center of curvature of the shell, it must satisfy the condition:

$$P_c = -JP \qquad (a)$$

where $$J = V_c/NV$$

If the image surface is to be flat, it must satisfy the additional relation:

$$t = \frac{4E(1-E)}{\left(1-\frac{J}{N_c}\right)\frac{N-1}{(N)} + 2(1-E)} \qquad (b)$$

In the design of practical systems, small departures from conditions (a) and (b) above are desirable in order to balance high order aberrations. Larger departures are permissible in the design of short focal length systems. In order to obtain relatively small values for $P_c$ so that the corrector lens does not introduce any substantial astigmatism into the system, J should be made as small as reasonable (see relation (a) above). To accomplish this, the dispersion of the refractive material of the corrector should be great relative to the dispersion of the material of the shell (i.e., the reciprocal dispersion of the corrector material, $V_c$, should be small relative to that of the shell material, V). In addition, the optical material of the shell is chosen to have a relatively large index of refraction, N, considering its relatively low dispersion (large V). In other words the product $NV$ in the denominator is made large by suitable choice of refractive material for the shell, and the optical material of the corrector is chosen to have a low $V_c$ (great dispersion) relative to the shell material if different materials are utilized for these two elements (as is true of Examples #1 and #2 in Table I).

Four examples of systems designed in accordance with the teachings of the present invention are given in Table I below.

TABLE I

|  | Example #1 | Example #2 | Example #3 | Example #4 |
|---|---|---|---|---|
| $N_c$ | 4.0454 | 1.720 | 1.517 | 1.4503 |
| $V_c$ | 57.5 | 29.3 | 64.2 | 20.9 |
| N | 3.432 | 1.517 | 1.517 | 1.4503 |
| V | 161.1 | 64.2 | 64.2 | 20.9 |
| J | .104 | .301 | .659 | .690 |
| E | .7785 | .8932 | .9700 | .8933 |
| t (calculated) | .609 | .771 | .461 | 1.013 |
| t (actual) | .608 | .733 | .461 | .720 |
| $P_c$ (calculated) | .030 | .040 | .036 | .081 |
| $P_c$ (actual) | .031 | .040 | .036 | .080 |
| $S_2$ | .7300 | .5875 | .5000 | .5878 |
| B.f.l. | 1.16 | 1.12 | 1.11 | .899 |
| E.f.l. | 1.86 | 2.00 | 2.10 | 1.91 |

In the above Table I, all of the quantities have already been defined except for the last three. $S_2$ is the axial distance (as shown in the drawing) between the rear surface (4, 6) of the spherical shell and the point 18 which represents the center of the front surface 5 of primary mirror 15. The term b.f.l. is the back focal length or distance to the image plane 28 as measured from secondary mirror surface 6, as also shown in the drawing. Finally e.f.l. is the effective or equivalent focal length of the entire optical system.

From the quantities given in the table, the various physical parameters may be readily determined. Thus, the radii of the various optical surfaces 1 through 6 (designated $R_1$ through $R_6$) are readily computed from the parameters already given. Since the focal length of the primary mirror 15 is assumed to be one, the radius of curvature of this mirror surface ($R_5$) will be 2. Since the corrector lens 11 (as measured by its optical center 12) is at the center of curvature of both surfaces 3 and 4, the distance between this optical center 12 and the front surface 3 of the shell, designated $S_1$, is in general equal to the radius of curvature ($R_3$) of this first surface of the shell. Since the positive corrector lens is chosen to be of the easily manufactured biconvex form for all of the above examples (although it is not necessary for the corrector lens to be of this form), the following relationships are readily apparent from the geometry of the system and the well known lens-maker's formula:

$$R_1 = -R_2 = 2(N_c-1)/P_c \quad (c)$$
$$S_1 = -R_3{}^1 = 2E - t$$
$$R_4 = R_6 = -2E$$
$$R_5 = -2$$

[1] In Example #2, the shell is not quite concentric; in this example $-R_3 = 2E - t - .007$.

By utilizing in the above relationships the parameters given for the four examples in Table I, the physical constants of these examples are easily determined. These are given in Table II, below. It should be noted that, since the corrector lens need not be biconvex in form, Table II merely contains its power, $P_c$, previously given. When this corrector is biconvex, relationship (c) above gives the desired radii of curvature for this lens directly. For convenience, not only is this power, $P_c$, repeated from Table I in Table II below, but also the thickness of the shell, $t$, and the spacing of the two mirror surfaces, $S_2$, are also reproduced in Table II.

TABLE II

|  | Example #1 | Example #2 | Example #3 | Example #4 |
|---|---|---|---|---|
| $P_c$ | .031 | .040 | .036 | .080 |
| $S_1 = -R_3$ | .9494 | 1.0463 | 1.4792 | 1.0665 |
| t | .6076 | .7333 | .4608 | .7202 |
| $R_4 = R_6$ | -1.5570 | -1.7865 | -1.9400 | -1.7867 |
| $S_2$ | .7300 | .5875 | .50000 | .5878 |
| $R_5$ | -2.0000 | -2.0000 | -2.0000 | -2.0000 |

It should be pointed out that the specific examples given above all utilize a concave primary mirror having a radius of curvature of two units (say, inches). It is, of course, obvious that this choice is arbitrary, and that the choice of another radius of curvature for the primary mirror will yield different, but analagously related values for all of the other physical constants, according to the relationships previously given. The above four examples are chosen to illustrate different possibilities of utilization of the invention for different spectral regions, as well as variation of other factors, as described below. First, each of the examples will be described with reference to a specific adaption thereof, involving only a change of scale from the dimensions given above.

The first example is designed for use in the infrared region of the spectrum. The corrector lens is composed of germanium and the shell of silicon. A four inch focal length version having an optical speed of f/2.0 is essentially diffraction limited for a total field of 10° for energy in the spectral region of 2 through 5 microns, without requiring any aspheric surfaces.

The second example is intended for use in the visible regions of the spectrum. In this example, as in the first, the corrector material is chosen to have a high dispersion relative to that of the shell optical material. A four inch f/1.5 system having parameters corresponding to those of this example requires one aspheric surface on the corrector. In addition (as shown above), a small departure from concentricity of the shell was introduced to minimize high order coma. Further, a small amount of (undercorrected) Petzval sum was introduced by making t somewhat smaller than the value calculated by Equation b above. The resulting system forms images in which the bulk of the visible light is concentrated into a 10 micron spot for any point within a total field of 10°.

The third example satisfies relations (a) and (b) exactly while utilizing the same optical material for both the shell and the corrector lens. Such a system, which is utilized in the visual region of the spectrum may be designed as a highly corrected four inch focal length f/2 system with the total field of 10° by the use of a single aspheric surface on corrector 11. It should be noted that the use of a single material for the two refractive elements in the system will reduce the secondary spectrum essentially to zero.

The fourth and last example is a system in which a large departure was made from the value of t calculated by Equation b. In this case also, the corrector and shell are made of the same optical material. This system was specifically designed for use over a large spectral range (.4 to 2 microns), which is accomplished in part by the use of a single optical material. This example was intended for use at a short focal length (16 mm.) at f/2 with a small total field (5°). Advantage was taken of this short focal length and the small field to make $t$ appreciably smaller than theoretically calculated without affecting the imagery by any appreciable amount. No aspheric surfaces are required to make this system a diffraction limited anastigmat in this size.

As may be seen from Table I in the above four examples, the calculated and actual power of the corrector lens ($P_c$) lie extremely close to each other so that the corrector lens eliminates the longitudinal chromatic aberration of the shell more or less exactly. See Equation $a$. In Examples #1 and #3 the calculated and actual thickness of the shell ($t$) are also essentially equal so that the image is almost perfectly flat. See relationship ($b$). In addition, Example #3 utilizes a single refractive material.

On the other hand, each of Examples #2 and #4 illustrates permissible departure from the theoretical dimension of $t$ given by Equation $b$. Example #2 utilizes a slight departure from true concentricity of the first surface of the shell relative to the second surface. In particular, the curvature of this surface is made somewhat steeper (so as to cause $R_3$ to be somewhat smaller), thereby decreasing the thickness of the shell as may be seen by the actual value of $t$. As previously stated, this departure was introduced to balance higher order coma, which would otherwise adversely affect the somewhat wider angle, higher speed optical system mentioned above. Similarly, Example #4 illustrates how the shell 13 may be made considerably thinner than its theoretical calculated $t$, when the resulting curvature of the image field may be tolerated (in the specific example because of the short focal length and small angular field, the relatively small image departs from a plane only by a small amount in linear dimensions). The use of a value for $t$ less than the ideal one allows the other necessary relationships of the parameters to be more easily achieved.

Thus, Examples #1 and #3 may be considered typical embodiments of the invention, wherein the parameters satisfy Equations $a$ and $b$ essentially exactly; Examples #2 and #4 are illustrative of two different types of departures in the parameters of the shell which may be made for various purposes. Because of these permissible (and, particularly as to the Example #2 departure, desirable) possible departures from strict conformity to Equations $a$ and $b$, the invention is not limited to any exact solutions of these equations. On the contrary, the invention is deemed to consist of all of those systems, having the same structural relationships exemplified by the drawing which one skilled in the art may derive from these formulas, the tabulated embodiments thereof, and both the exemplary and obvious departures therefrom. For these reasons the invention is not limited to any of the specific embodiments thereof described above, but rather is defined solely by the scope of the appended claims.

I claim:

1. A catadioptric anastigmatic optical system having a relatively flat field comprising in alignment along an optical axis:
   a primary concave spherical mirror;
   a refractive spherical shell positioned in front of said primary mirror and having its outer convex surface facing the reflecting concave surface of said primary mirror;
   said outer convex surface of said shell being rendered reflective in its central area so as to act as a secondary convex mirror to rays of light converged by said primary concave mirror;
   the two optical surfaces of said shell being parts of substantially concentric spheres so that the centers of curvature of said surfaces are substantially at a single coincident point;
   said refractive shell being of such construction and optical material as to substantially correct the combined spherical aberration of said spherical primary mirror and central reflecting surface of said shell;
   and a single front refractive element, consisting of a single refractive material, of relatively low power positioned in front of said shell;
   the optical center of said refractive element being located substantially at said single coincident point;
   the dioptric power of said refractive shell, P, and the dioptric power of said front refractive element, $P_c$, essentially satisfying the relation:

$$P_c = -JP$$

in which:

$$J = V_c/NV$$

wherein $V_c$ is the reciprocal dispersion of the single material of said front refractive element and N is the index of refraction and V is the reciprocal dispersion of the material of said refractive shell;
so that the longitudinal chromatic abberration caused by said shell is corrected by said front refractive element.

2. The optical system according to claim 1, in which: one of the refractive surfaces of said front refractive element is aspheric.

3. The optical system according to claim 1, in which: said refractive spherical shell and said front refractive element are entirely composed of the same refractive material.

4. The optical system according to claim 1, in which: said concave spherical mirror and said outer reflective convex surface of said refractive spherical shell have such radii of curvature and are so positioned relative to each other that the principal focal plane of said system lies on the side of said concave spherical mirror remote from said spherical shell and front refractive element;
said concave spherical mirror being apertured in its central position to allow the rays reflected by said reflective outer convex surface to pass through said concave mirror to said focal plane.

5. The optical system according to claim 1, in which: the axial thickness of said shell, $t$, substantially satisfies the relation:

$$t = \frac{4E(1-E)}{\left(1 - \frac{J}{N_c}\right)\left(\frac{N-1}{N}\right) + 2(1-E)}$$

in which:

$$J = V_c/NV$$

wherein: E is the ratio of the radius of curvature of said secondary convex mirror to the radius of curvature of said primary concave mirror, $N_c$ and $V_c$ are the index of refraction and reciprocal dispersion, respectively, of the single material of said front refractive element, and N and V are the index of refraction and reciprocal dispersion, respectively, of the material of said refractive shell;
so that the image produced by said system is substantially flat so that said system is a flat field anastigmat.

6. The optical system according to claim 1 in which the parameters substantially correspond to the following table:

$$N_c = 4.0454$$
$$V_c = 57.5$$
$$P_c = .031$$
$$S_1 = -R_3 = .9494$$
$$N = 3.432$$
$$V = 161.1$$
$$t = .608$$
$$R_4 = R_6 = -1.5570$$
$$S_2 = .7300$$
$$R_5 = -2.000$$
$$b.f.l. = 1.16$$
$$e.f.l. = 1.86$$

wherein $N_c$ and $V_c$ are the index of refraction and reciprocal dispersion (over the spectral region utilized), respectively, of the single material used for the front refractive element;

$P_c$ is the dioptric power of said refractive element;

$S_1$ is the axial distance from the optical center of said refractive to the front concave surface of said refractive spherical shell;

$R_3$ is the radius of curvature of said front concave surface;

$N$ and $V$ are the index of refraction and reciprocal dispersion (over the spectral region utilized) respectively, of the material used for the spherical shell;

$R_4$ is the radius of curvature of the rear convex surface of said shell;

$R_6$ is the radius of curvature of the secondary convex mirror formed on said rear convex surface;

$S_2$ is the axial distance between said rear convex surface of said shell and the point representing the intersection of the surface of said primary concave mirror with the optical axis of the system;

$R_5$ is the radius of curvature of said surface of said primary concave mirror;

b.f.l. is the axial distance between said secondary convex mirror on said rear convex surface of said shell and the image plane;

and e.f.l. is the equivalent focal length of the entire optical system.

7. The optical system according to claim 1, in which the parameters substantially correspond to the following table:

$$N_c = 1.720$$
$$V_c = 29.3$$
$$P_c = .040$$
$$S_1 = -R_3 = 1.0463$$
$$N = 1.517$$
$$V = 64.2$$
$$t = .733$$
$$R_4 = R_6 = -1.7865$$
$$S_2 = .5875$$
$$R_5 = -2.000$$
$$b.f.l. = 1.12$$
$$e.f.l. = 2.00$$

wherein: $N_c$ and $V_c$ are the index of refraction and reciprocal dispersion (over the spectral region utilized), respectively, of the single material used for the front refractive element;

$P_c$ is the dioptric power of said refractive element;

$S_1$ is the axial distance from the optical center of said refractive to the front concave surface of said refractive spherical shell;

$R_3$ is the radius of curvature of said front concave surface;

$N$ and $V$ are the index of refraction and reciprocal dispersion (over the spectral region utilized) respectively, of the material used for the spherical shell;

$R_4$ is the radius of curvature of the rear convex surface of said shell;

$R_6$ is the radius of curvature of the secondary convex mirror formed on said rear convex surface;

$S_2$ is the axial distance between said rear convex surface of said shell and the point representing the intersection of the surface of said primary concave mirror with the optical axis of the system;

$R_5$ is the radius of curvature of said surface of said primary concave mirror;

b.f.l. is the axial distance between said secondary convex mirror on said rear convex surface of said shell of the image plane;

and e.f.l. is the equivalent focal length of the entire optical system.

8. The optical system according to claim 1, in which the parameters substantially correspond to the following table:

$$N_c = 1.517$$
$$V_c = 64.2$$
$$P_c = .036$$
$$S_1 = -R_3 = 1.4792$$
$$N = 1.517$$
$$V = 64.2$$
$$t = .461$$
$$R_4 = R_6 = -1.9400$$
$$S_2 = .5000$$
$$R_5 = -2.000$$
$$b.f.l. = 1.11$$
$$e.f.l. = 2.10$$

wherein: $N_c$ and $V_c$ are the index of refraction and reciprocal dispersion (over the spectral region utilized), respectively, of the single material used for the front refractive element;

$P_c$ is the dioptric power of said refractive element;

$S_1$ is the axial distance from the optical center of said refractive to the front concave surface of said refractive spherical shell;

$R_3$ is the radius of curvature of said front concave surface;

$N$ and $V$ are the index of refraction and reciprocal dispersion (over the spectral region utilized) respectively, of the material used for the spherical shell;

$R_4$ is the radius of curvature of the rear convex surface of said shell;

$R_6$ is the radius of curvature of the secondary convex mirror formed on said rear convex surface;

$S_2$ is the axial distance between said rear convex surface of said shell and the point representing the intersection of the surface of said primary concave mirror with the optical axis of the system;

$R_5$ is the radius of curvature of said surface of said primary concave mirror;

b.f.l. is the axial distance between said secondary convex mirror on said rear convex surface of said shell and the image plane;

and e.f.l. is the equivalent focal length of the entire optical system.

9. The optical system according to claim 1, in which the parameters substantially correspond to the following table:

$$N_c = 1.4503$$
$$V_c = 20.9$$
$$P_c = .080$$
$$S_1 = -R_3 = 1.0665$$
$$N = 1.4503$$
$$V = 20.9$$
$$t = .720$$
$$R_4 = R_6 = -1.7867$$
$$S_2 = .5878$$
$$R_5 = -2.000$$
$$b.f.l. = .899$$
$$e.f.l. = 1.91$$

wherein: $N_c$ and $V_c$ are the index of refraction and reciprocal dispersion (over the spectral region utilized), respectively, of the single material used for the front refractive element;

$P_c$ is the dioptric power of said refractive element;

$S_1$ is the axial distance from the optical center of said refractive to the front concave surface of said refractive spherical shell;

$R_3$ is the radius of curvature of said front concave surface;

$N$ and $V$ are the index of refraction and reciprocal dispersion (over the spectral region utilized) respectively, of the material used for the spherical shell;

$R_4$ is the radius of curvature of the rear convex surface of said shell;

$R_6$ is the radius of curvature of the secondary convex mirror formed on said rear convex surface;

$S_2$ is the axial distance between said rear convex surface of said shell and the point representing the intersection of the surface of said primary concave mirror with the optical axis of the system;

$R_5$ is the radius of curvature of said surface of said primary concave mirror;

b.f.l. is the axial distance between said secondary convex mirror on said rear convex surface of said shell and the image plane;

and e.f.l. is the equivalent focal length of the entire optical system.

References Cited by the Examiner

UNITED STATES PATENTS

| | | | |
|---|---|---|---|
| 2,801,570 | 8/1957 | Nomarski et al. | 88—57 |
| 3,049,054 | 8/1962 | Waland | 88—57 |
| 3,110,752 | 11/1963 | Becker | 88—67 |

OTHER REFERENCES

Linfoot: "Recent Advances in Astronomical Camera Design," The Photographic Journal, vol. 88(B), May-June 1948, pp. 58–64.

JEWELL H. PEDERSEN, *Primary Examiner.*

JOHN K. CORBIN, *Assistant Examiner.*